(12) United States Patent
Bhatnagar et al.

(10) Patent No.: US 7,601,654 B2
(45) Date of Patent: Oct. 13, 2009

(54) MOLDED BALLISTIC PANEL WITH ENHANCED STRUCTURAL PERFORMANCE

(75) Inventors: Ashok Bhatnagar, Richmond, VA (US); Brian Arvidson, Chester, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/393,413

(22) Filed: Mar. 30, 2006

(65) Prior Publication Data
US 2007/0238379 A1    Oct. 11, 2007

(51) Int. Cl.
*B32B 27/04*    (2006.01)
*B32B 27/12*    (2006.01)
*B32B 5/02*    (2006.01)
*B21D 39/00*    (2006.01)

(52) U.S. Cl. .................. 442/135; 442/134; 442/381; 428/593; 428/911; 428/920; 428/921; 181/292; 89/36.01; 89/36.04; 264/258

(58) Field of Classification Search ............... 442/134, 442/135, 381; 428/911, 920, 921, 593; 181/292; 89/36.01, 36.04; 264/258

See application file for complete search history.

(56) References Cited

U.S. PATENT DOCUMENTS

| 4,613,535 | A | 9/1986 | Harpell et al. ............ 428/113 |
|---|---|---|---|
| 5,317,950 | A | 6/1994 | Binon et al. .............. 89/36.02 |
| 6,253,655 | B1 | 7/2001 | Lyons et al. ............. 89/36.02 |
| 6,568,310 | B2 | 5/2003 | Morgan ................... 89/36.02 |
| 6,642,159 | B1 | 11/2003 | Bhatnagar et al. .......... 442/134 |
| 6,703,104 | B1 | 3/2004 | Neal ........................ 428/118 |
| 6,825,137 | B2 | 11/2004 | Fu et al. ................... 442/135 |
| 2003/0114064 | A1 | 6/2003 | Fu et al. ................... 442/239 |

FOREIGN PATENT DOCUMENTS

| EP | 0544561 | 11/1992 |
|---|---|---|
| FR | 2764370 | 6/1997 |

*Primary Examiner*—Norca L Torres-Velazquez (57) ABSTRACT

Ballistic resistant composites and articles formed therefrom for use in airplanes and other vehicles which meets particular structural, impact and ballistic requirements. An aerospace-specification grade honeycomb is positioned between panels comprising non-woven ballistic resistant fibrous layers, and optionally one or more fire resistant layers. The composites and the articles formed therefrom have superior structural, impact, fire resistance and ballistic performance at a light weight.

43 Claims, 1 Drawing Sheet

MOLDED BALLISTIC PANEL WITH ENHANCED STRUCTURAL PERFORMANCE

BACKGROUND OF THE INVENTION

1. Field of the Invention

The invention relates to ballistic resistant composites for use in airplanes and other vehicles, which meet particular structural, impact and ballistic requirements. More particularly, the invention pertains to composite structures incorporating high strength, ballistic resistant panels and aerospace grade honeycomb, which composite structures have superior structural, impact and ballistic performance at a light weight.

2. Description of the Related Art

Ballistic resistant articles containing high strength fibers that have excellent properties against projectiles are well known. High strength fibers conventionally used include polyolefin fibers, such as extended chain polyethylene fibers, and aramid fibers, such as para- and meta-aramid fibers. For many applications, the fibers may be used in a woven or knitted fabric. For other applications, the fibers may be encapsulated or embedded in a matrix material to form non-woven rigid or flexible fabrics.

Various ballistic resistant constructions are known that are useful for the formation of hard or soft armor articles such as helmets, structural panels and ballistic resistant vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

Honeycomb materials are generally characterized by alternating single-walled and double-walled geometric cells, which enable the structure to be highly resilient and lightweight. More particularly, aerospace honeycomb is a honeycomb-shaped structural material that is commonly employed in composites forming structural members in aircraft, vehicles, as well in other articles such as sporting equipment and personal care products, because of their low weight, high strength and versatility. In recent years, such desirable properties have made honeycomb structures increasingly popular for use in composite structures together with ballistic resistant materials to a composite having excellent ballistic resistance in addition to shock-absorbing protection, together with superior structural properties.

Currently, there exists a growing demand for the enhancement of ballistic and forced entry resistant materials, particularly ballistic and forced entry resistant door and wall panels for use in commercial airlines and maritime vessels, to provide improved security and protection to vessel crew and enhance overall passenger safety. For example, U.S. Pat. No. 6,568,310 teaches a composite door including a woven ballistic resistant layer surrounded on each side by a mesh or mail material with a structural honeycomb being bonded to each mesh layer. U.S. Pat. No. 6,703,104 teaches a composite panel for use in aircraft interiors including a honeycomb core that is surrounded on each side by layers of fiberglass and having a woven fabric on the outermost surfaces of the fiberglass layers. U.S. Pat. No. 6,825,137 teaches a composite ballistic resistant panel for use as a structural member in an aircraft, which panel includes a honeycomb that is directly attached to a woven ballistic resistant material on one surface and to a fire resistant fibrous film on its other surface. U.S. Pat. No. 6,976,658 teaches a cockpit door formed by laminating a layer of an aromatic polyamide between a honeycomb on one side and a reinforcing member on its other side.

The present invention provides an alternate composite structure to those described in the related art. Particularly, the present invention provides a composite having non-woven fibrous layers juxtaposed with a central panel which comprises a honeycomb-shaped structure which comprises a plurality of closely packed geometric cells. One or more layers of a fire resistant material, such as fiberglass, may be attached to one or more surfaces of the non-woven fibrous layers to provide fire resistance. The composites of the invention have excellent structural properties while also meeting or exceeding the requirements of the National Institute for Justice level III-A ballistic penetration standard. Accordingly, they are particularly useful for the formation of structural members of airplanes and other vehicles, such as doors and bulk head structures.

SUMMARY OF THE INVENTION

The invention provides a ballistic resistant composite comprising:

a) a first panel comprising a plurality of non-woven fibrous layers, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more;

b) a central panel in juxtaposition with said first panel; the central panel comprising a plurality of closely packed geometric cells; and c) a second panel comprising a plurality of non-woven fibrous layers in juxtaposition with said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more.

The invention also provides a ballistic resistant composite comprising:

a) a first panel comprising a plurality of non-woven fibrous layers, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said first panel having two opposing surfaces;

b) a central panel in juxtaposition with said first panel; the central panel comprising a plurality of closely packed geometric cells;

c) a second panel comprising a plurality of non-woven fibrous layers in juxtaposition with said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said second panel having two opposing surfaces;

d) at least one layer of a fire resistant material attached to at least one surface of said first panel; and e) optionally, at least one layer of a fire resistant material attached to at least one surface of said second panel.

The invention further provides a method for forming a ballistic resistant composite comprising:

a) providing a central panel comprising a plurality of closely packed geometric cells, said central panel having first and second surfaces;

b) attaching a first panel comprising a plurality of non-woven fibrous layers to the first surface of said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said first panel having two opposing surfaces; and c) attaching a second panel comprising a plurality of non-woven fibrous layers to the second surface of said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said first panel having two opposing surfaces.

DETAILED DESCRIPTION OF THE INVENTION

The invention provides ballistic resistant composites for the formation of structural members of vehicles and other articles that require superior ballistic and impact resistance, in addition to high structural integrity. For the purposes of the invention, articles that have superior ballistic penetration resistance describe those which exhibit excellent properties against deformable projectiles. The articles also exhibit excellent resistance properties against fragment penetration, such as shrapnel.

Figure 2:
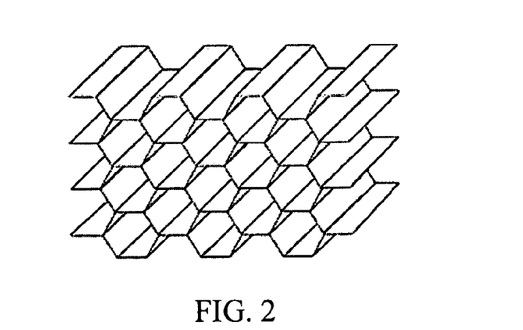
FIG. 2 is a perspective view schematic representation of a hexagonal honeycomb shaped structure.

In the composites of the invention, the central panel comprises a structural material which is known in the art as a honeycomb. More particularly, the honeycomb is a flexible or rigid structural material that comprises a plurality of closely packed geometric cells that together form a lightweight honeycomb-shaped structure having high specific stiffness, high specific strength and unique energy-absorbing characteristics. Such honeycomb-shaped structures are well known in the art. As illustrated in FIG. 2, the geometric shape of the cells forming the central panel 10 may be hexagonal, similar to the structure of a natural honeycomb constructed by bees. Alternately, the geometric shape of the packed cells may be non-hexagonal. For example, the cells may be circular, elliptical, triangular, square, rectangular, pentagonal, octagonal or another suitable shape, including over-expanded structures of various geometric shapes. Also suitable are reinforced honeycomb and other regular or irregular cellular frameworks as would be determined by one skilled in the art. While the central panel may also be formed from non-honeycomb core materials, such as balsa and polymeric foam materials, these are not preferred primarily because of their significantly reduced load carrying and strength properties compared to honeycomb materials.

The cells forming central panel 10 may be fabricated from a variety of materials, including rigid and flexible materials. In a preferred embodiment of the invention, the cells are formed from an aramid (aromatic polyamide) material such as Nomex®, a flame retardant meta-aramid material; Korex®, a high-strength para-aramid paper material; or Kevlar® aramid fiber honeycomb, each manufactured by E.I. duPont de Nemours and Company of Wilmington, Del. Other suitable materials non-exclusively include metals, such as aluminum, metal alloys, carbon, fiberglass, thermoplastic materials, such as polyurethane, and other materials conventionally known by those in the art for the formation of such honeycomb-shaped structures.

There are two main methods for the manufacture of honeycomb: the expansion process and the corrugated process. The expansion process is typically used for the manufacture of low density honeycomb materials, while the corrugated process is commonly used for the manufacture of high density honeycomb materials. In the expansion process, sheets of a substrate material coated with stripes of an adhesive are stacked, followed by curing the adhesive in a heated press to form a block. The block is then sliced to a desired size and expanded, in either order. In the corrugated process, an adhesive is applied to corrugated nodes, followed by stacking the corrugated nodes into a block. Following curing of the adhesive, sheets of a desired thickness may be cut from the block. Other methods may be used as well. For example, thermoplastic honeycombs are usually produced by extrusion, followed by slicing to the desired thickness. Regardless of the method used, the honeycombs may optionally be coated with various substances, such as corrosion-resistant materials, or may be coated or impregnated with a polymer such as a phenolic resin, a polyimide resin, an epoxy, a polyester, a polyurethane, or another material as is well known in the art. For example, paper honeycombs are conventionally dipped in a resin and cured to add strength. The cells of the honeycomb can also be filled with a foam. This option may be conducted for the purpose of providing a greater bonding area for additional layers that may be bonded to the honeycomb, increasing the mechanical properties of the honeycomb by stabilizing the cell walls, and increasing thermal insulation properties.

The particular materials and techniques used to form the honeycomb shaped structures generally depends on the type of honeycomb required for its intended application. For example, honeycomb structures are currently commercially available as, for example, aerospace specification grade honeycomb and commercial specification grade honeycomb. Each grade of honeycomb is characterized by a number of factors, including the type and strength of the honeycomb material, cell configuration, cell size and frequency, alloy and foil gauge (if an aluminum honeycomb) and density. Honeycomb panels can range from about 3 mm to about 50 mm or more in thickness, and have dimensions of from about 1200 mm×2400 mm or greater. Cell sizes generally range from 1/16" to 1" (1.59 mm to 25.4 mm), with 1/8", 3/16", 1/4", and 3/8" (3.175 mm, 4.762 mm, 6.35 mm, 9.525 mm) being the most common. Honeycomb densities generally range from 1.0 lb/ft³ to 55 lb/ft³ (16 kg/m³ to 881 kg/m³). Different honeycombs may also vary in properties such as density, cell wall thickness, crush or compression strength and impact strength, as well as fire resistance or formability.

For the purposes of this invention, the most preferred type of honeycomb is formed from Nomex® meta-aramid fibers, with the honeycomb preferably coated in a phenolic resin. The preferred honeycomb has a hexagonal cell shape, a cell size of about 1/8" (3.175 mm), a cell thickness of about 1/2"

(12.7 mm), a nominal density of about 5.0 lb/ft³ (80 kg/m³), and qualifies as aerospace specification grade. Preferred honeycombs are commercially available from Hexcel Corporation of Stamford, Conn., such as HexWeb® CFC-20 honeycomb.

Figure 1:
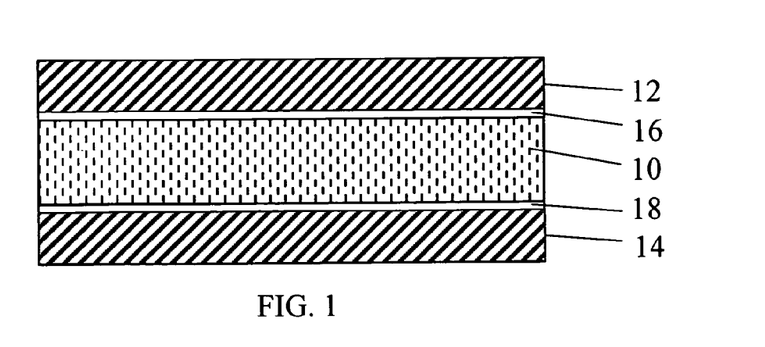
FIG. 1 is a perspective view schematic representation of a composite including a honeycomb-shaped central panel and having a non-woven fibrous panel adhesively attached to the central panel on opposite sides of the central panel.

As illustrated in FIG. 1, the central panel 10 has two opposing surfaces and is positioned between a first panel 12 and a second panel 14. The central panel 10 is positioned such that the open portions of the packed geometric cells face the planar surfaces of panels 12 and 14. Each of the first panel and the second panel comprise a plurality of non-woven fibrous layers formed from high strength fibers having a preferred tenacity of about 7 g/denier or more and a preferred tensile modulus of about 150 g/denier or more. As opposed to woven fibrous layers, the non-woven fibrous layers of the invention preferably comprise a plurality of fibers which are unidirectionally aligned in an array such that they are substantially parallel to each other along a common fiber direction. In each embodiment of the invention, the non-woven fibrous layers comprise a plurality of fibers that have been applied with a polymeric composition, known in the art as a matrix composition, and which layers are consolidated to form at least one single-layer, consolidated network of fibers. As used herein, a single-layer, consolidated network comprises a plurality of cross-plied fiber layers which are stacked together and consolidated into a single layer structure, uniting the fibers and the matrix composition of each component fiber layer. The consolidated network may also comprise a plurality of yarns that are coated with such a matrix composition, formed into a plurality of non-woven layers, and consolidated into a fabric. Alternately, the non-woven fibrous layers may comprise a non-woven felted material formed using conventionally known techniques, comprising fibers in a random orientation embedded in a suitable matrix composition. However, in the preferred embodiments of the invention, the fiber layers forming the single-layer, consolidated networks comprise the unidirectional array of fibers.

Each of the first panel 12 and the second panel 14 may comprise more than one single-layer, consolidated network, i.e. more than one ply, of non-woven fibers. Each single-layer, consolidated fiber network may also comprise greater than two layers of parallel fibers. The total number of layers forming a consolidated fiber network and the number of single-layer, consolidated fiber networks forming the non-woven panels will vary depending upon the ultimate use of the desired ballistic resistant article. For example, in a preferred structure of the invention wherein the ballistic resistant composites are used as a door or bulkhead for use in a vehicle or aircraft, the first panel comprises eleven separate single-layer, consolidated fiber networks (i.e. 11 plies), and the second panel comprises twenty-six separate single-layer, consolidated fiber networks (i.e. 26 plies), wherein each single-layer, consolidated fiber network is formed from two united, unidirectional fiber layers. Such a structure including a total of thirty-seven plies has sufficient thickness and ballistic resistance to stop the penetration of a handgun bullet fired at a composite of the invention. The overall composite structure may also have a symmetrical or non-symmetrical construction, depending on its intended application. For example, if the above thirty-seven ply non-symmetrical composite is used to form a cockpit door for an airplane, the panel including twenty-six plies is preferably positioned closer to the cockpit side of the aircraft, and the panel including eleven plies is preferably positioned closer to the passenger side of the aircraft. This offers a balance between the structural and ballistic properties of the composite. If higher structural properties are required, a symmetrical construction may be used.

If higher ballistic properties are required, an unsymmetrical construction is preferred, with the higher number of layers on the side where the higher ballistic resistance is most desirable. At minimum, each of the first panel and the second panel will include at least one ply, and each may include as many as 400 plies or more as a maximum.

For the purposes of the present invention, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

As used herein, a "yarn" is a strand of interlocked fibers. An "array" describes an orderly arrangement of fibers or yarns, and a "parallel array" describes an orderly parallel arrangement of fibers or yarns. A fiber "layer" describes a planar arrangement of non-woven fibers or yarns. A fiber "network" denotes a plurality of interconnected fiber or yarn layers. A "consolidated network" describes a consolidated combination of fiber layers with a matrix composition. As used herein, a "single layer" structure refers to structure composed of one or more individual fiber layers that have been consolidated into a single unitary structure, i.e. a single ply.

For the purposes of the present invention, the term "coated" is not intended to limit the method by which the polymeric matrix composition is applied onto the fiber surface or surfaces. The application of the matrix is conducted prior to consolidating the fiber layers, and any appropriate method of applying the polymeric matrix composition onto the fiber surfaces may be utilized. Accordingly, the fibers of the invention are coated on, impregnated with, embedded in, or otherwise applied with a matrix composition by applying the matrix composition to the fibers and then consolidating the matrix composition-fibers combination to form a composite. By "consolidating" is meant that the matrix material and each individual fiber layer are combined into a single unitary layer. Consolidation can occur via drying, cooling, heating, pressure or a combination thereof. The term "composite" refers to consolidated combinations of fibers with the matrix material. The term "matrix" as used herein is well known in the art, and is used to represent a binder material, such as a polymeric binder material, that binds the fibers together after consolidation.

Useful polymeric matrix compositions include both low modulus, thermoplastic matrix materials and high modulus, thermosetting matrix materials, or a combination thereof. Suitable thermoplastic matrix compositions preferably comprise elastomers having an initial tensile modulus of less than about 6,000 psi (41.3 MPa), and suitable high modulus, thermosetting compositions preferably have an initial tensile modulus of at least about 300,000 psi (2068 MPa), each as measured at 37° C. by ASTM D638. As used herein throughout, the term tensile modulus means the modulus of elasticity as measured by ASTM D638 for a matrix material.

The rigidity, impact and ballistic properties of articles formed from the composites of the invention are affected by the tensile modulus of the matrix polymer. For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus polymers, and also compared to the same fiber structure without a matrix. However, low tensile modulus matrix polymers also yield lower rigidity composites. Further, in certain applications, particularly those where a composite must function in both anti-ballistic and structural modes, there is needed a superior combination of ballistic resistance and rigidity. Accordingly, the most appropriate type of matrix polymer to be used will vary depending on the type of article to be formed from the fabrics of the invention. In order to achieve a compromise in both properties, a suitable matrix composition may combine both low modulus and high modulus materials to form a single matrix composition, so long as the combination produces a polymeric matrix composition that is resistant to dissolution by water and resistant to dissolution by one or more organic solvents.

In the most preferred embodiments of the invention, the matrix composition comprises a thermosetting polymer composition. Preferred are thermosetting polymers that are soluble in carbon-carbon saturated solvents such as methyl ethyl ketone, and possessing a high tensile modulus when cured of at least about $1\times10^6$ psi (6895 MPa) as measured by ASTM D638. Preferred matrix compositions include thermoset vinyl esters and combinations of at least one thermoset vinyl ester with a diallyl phthalate, and optionally a catalyst for curing the vinyl ester polymer. Also suitable are combinations of a vinyl ester polymer together with one or more block copolymers of conjugated dienes and vinyl aromatic monomers. Many of these block polymers are produced commercially by the Shell Chemical Company and described in the bulletin "Kraton Thermoplastic Rubber", SC:68:82.

Preferably, the vinyl ester is one produced by the esterification of a polyfunctional epoxy resin with an unsaturated monocarboxylic acid, usually methacrylic or acrylic acid. Illustrative vinyl esters include diglycidyl radiate, diglycidyl isophthalate, di-(2,3-epoxybutyl) adipate, di-(2,3-epoxybutyl) oxalate, di-(2,3-epoxyhexyl) succinate, di-(3,4-epoxybutyl) maleate, di-(2,3-epoxyoctyl) pimelate, di-(2,3-epoxybutyl) phthalate, di-(2,3-epoxyoctyl) tetrahydrophthalate, di-(4,5-epoxy-dodecyl) maleate, di-(2,3-epoxybutyl) terephthalate, di-(2,3-epoxypentyl) thiodipropionate, di-(5,6-epoxy-tetradecyl) diphenyldicarboxylate, di-(3,4-epoxyheptyl) sulphonyldibutyrate, tri-(2,3-epoxybutyl)-1,2,4-butanetricarboxylate, di-(5,6-epoxypentadecyl)maleate, di-(2,3-epoxybutyl)azelate, di(3,4-epoxypentadecyl) citrate, di-(4,5-epoxyoctyl) cyclohexane-1,3-dicarboxylate, di-(4,5-epoxyoctadecyl)malonate, bisphenol-A-fumaric acid polyester and similar materials. Particularly preferred are the vinyl esters available from Ashland Specialty Chemical Company of Dublin, Ohio under the trade name Derakane®.

Suitable catalysts, by way of example, include tert-butyl perbenzoate, 2,5-dimethyl-2,5-di-2-ethylhexanoylperoxyhexane, benzoyl peroxide and combinations thereof. Preferred solvents for the matrix composition are carbon-carbon saturated low boiling solvents including methyl ethyl ketone, acetone, ethanol, methanol, isopropyl alcohol, cyclohexane, ethyl acetone, and combinations thereof. As used herein, "carbon-carbon saturated" denotes a compound wherein all the bonds between carbon atoms are single bonds. Accordingly, a carbon-carbon saturated compound does not include any unsaturated carbon-carbon double bonds. After consolidation, there is only a trace, if any, of the solvent and catalyst.

A matrix composition comprising both a vinyl ester resin and a diallyl phthalate preferably includes from about 35% to about 65% by weight, more preferably about 55% to about 65% by weight of the vinyl ester polymer, about 2% to about 8%, more preferably about 3% to 6% by weight of diallyl phthalate, with the remainder comprising a low boiling point solvent based on the total weight of the composition. If a curing catalyst is present, it should comprise about 0.05% to about 1.0 weight %, more preferably about 0.2% to about 0.8 weight %. After consolidation, the matrix composition should include about 5% to about 15% by weight, more preferably about 8% to about 12% by weight of diallyl phthalate, based on the total weight of matrix composition, with the remainder comprising vinyl ester.

If a flexible, non-rigid composite is desired, a wide variety of low modulus, elastomeric materials and formulations may be utilized. Representative examples of suitable elastomers have their structures, properties, formulations together with crosslinking procedures summarized in the Encyclopedia of Polymer Science, Volume 5 in the section Elastomers-Synthetic (John Wiley & Sons Inc., 1964). Such matrix materials are moldable below the melting point of the fiber. Suitable low modulus elastomeric materials include polybutadiene, polyisoprene, natural rubber, polyethylene, cross-linked polyethylene, chlorosulfonated polyethylene, polypropylene, ethylene copolymers, propylene copolymers, ethylene-propylene copolymers, ethylene-propylene-diene terpolymers, polysulfide polymers, polyurethane elastomers, epoxies, polychloroprene, plasticized polyvinylchloride, butadiene acrylonitrile elastomers, poly(isobutylene-co-isoprene), polyacrylates, phenolics, polybutyrals, polyesters, polyethers, fluoroelastomers, silicone elastomers, thermoplastic elastomers and styrenic block copolymers, such as styrene-isoprene-styrene or styrene-butadiene-styrene types, and the like.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton® Thermoplastic Rubber", SC:68:81. The most preferred thermoplastic matrix polymer comprises styrenic block copolymers sold under the trademark Kraton® commercially produced by Kraton Polymers.

Most preferably, a low modulus elastomeric material consists essentially of at least one of the above-mentioned elastomers. A high modulus matrix or low modulus matrix may further also include fillers such as carbon black, silica, glass micro-balloons, etc. up to an amount not to exceed about 300% by weight of the matrix resins, preferably not to exceed 100% by weight, and may be extended with oils and vulcanized by sulfur, peroxide, metal oxide, or radiation cure systems using methods well known to rubber technologists. Blends of different elastomeric materials may be used together or one or more elastomer materials may be blended with one or more thermoplastics or thermosetting materials. For example, high density, low density, and linear low density polyethylene may be cross-linked to obtain a coating matrix material of appropriate properties, either alone or as blends.

In every instance, the modulus of a thermoplastic matrix should not exceed 6,000 psi (41.4 MPa) as measured by ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. Such a low modulus, thermoplastic elastomer also has a preferred elongation to break of at least about 50%, more preferably at least about 100% and most preferably has an elongation to break of at least about 300%.

When incorporating a thermosetting polymeric matrix composition, it may be further preferred to dispose a layer of an elastomer between adjacent fibrous layers to improve interlayer adhesion prior to consolidating each non-woven ply or prior to molding a plurality of non-woven plies into a panel. For example, to facilitate the 0°/90° cross-plying of two non-woven parallel arrays of fibers, it may be preferable to apply a layer or coating of an elastomer in between said arrays. It has been found that incorporation of a low modulus elastomeric layer between rigid fibrous layers markedly improves the impact and anti-ballistic properties of the composite, while the improved properties are obtained without effecting either the glass transition temperature of the matrix or the rigidity of the composite. Such is described with greater detain in U.S. Pat. No. 6,642,159 which is incorporated herein by reference. The elastomer layer is generally not necessary when a thermoplastic polymeric matrix composition is employed. The elastomer layer preferably has a tensile modulus less than about 6,000 psi (41,300 kPa), as measured by ASTM D638, with said elastomer providing a peel resistance of at least about 3 g/cm as determined on uncured fibrous layers with said elastomer there between after pressing at 66° C. for 5 seconds at 332 psi (2,290 kPa).

The elastomer employed in the practice of the invention may be any elastomer possessing a tensile modulus less than about 6000 psi (41,300 kPa) as measured by ASTM D638. Representative examples of suitable elastomers have their structures, properties and formulations summarized in the Encyclopedia of Polymer Science, Volume 5 in the section Elastomers-Synthetic (John Wiley & Sons Inc. 1964). The essential requirement is that they have the appropriately low moduli and yield the required peel resistance. For example, the following materials may be employed: polybutadiene, polyisoprene, natural rubber, ethylene-propylene copolymers, ethylene-propylene diene terpolymers, thermoplastic elastomers and others. Preferably, the elastomer possesses a tensile modulus less than about 2000 psi (13,800 kPa). Most preferably, the elastomer possesses a tensile modulus less than about 1000 psi (6895 kPa). Particularly useful are block copolymers of conjugated dienes and vinyl aromatic monomers. Many of these polymers are produced commercially by the Shell Chemical Company and described in the bulletin "Kraton Thermoplastic Rubber", SC:68:82 referenced above. The most preferred elastomers are compositions commercially available from 3M Inc. under the trademark Scotch-Grip®. Particularly useful is an elastomer solution commercially available as Scotch-Grip® 4693 consisting of about 10 wt % styrene/butadiene copolymer, about 10 wt % polyterpene and about 10 wt % polydipentene in about 10 wt % acetone and about 60 wt % cyclohexane.

The elastomer layer, if incorporated, may be applied using conventional techniques in the art, such as coating or spraying, and preferably constitutes only a minor part of the composite, from about 2 to 10 weight percent of the composite. Preferably, the optional elastomer constitutes from about 2 wt % to about 7 wt % of the composite. The elastomer layer need not be continuous and may consist of discrete areas on the fibrous layer. Preferably, the discrete areas of elastomeric coverage are uniformly distributed on the surface of the fibrous layer.

In the preferred embodiment of the invention, the proportion of the overall matrix composition making up each non-woven composite panel preferably comprises from about 7% to about 35% by weight of the composite, more preferably from about 7% to about 20% by weight of the composite, and most preferably from about 11% to about 20% by weight of the composite. Composites having a higher quantity of the matrix polymer will have lower ballistic resistance but higher structural properties.

The remaining portion of the composite is preferably composed of fibers. In accordance with the invention, the fibers comprising non-woven fibrous layers preferably comprise high-strength, high tensile modulus fibers. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include extended chain polyolefin fibers, such as highly oriented, high molecular weight polyethylene fibers, particularly ultra-high molecular weight polyethylene fibers, and ultra-high molecular weight polypropylene fibers. Also suitable are aramid fibers, particularly para-aramid fibers, extended chain polyvinyl alcohol fibers, extended chain polyacrylonitrile fibers, polybenzazole fibers, such as polybenzoxazole (PBO) and polybenzothiazole (PBT) fibers, and liquid crystal copolyester fibers. Each of these fiber types is conventionally known in the art.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,623,547 and 4,748,064.

Also particularly preferred are aramid (aromatic polyamide) fibers. Such are commercially available and are described, for example, in U.S. Pat. No. 3,671,542. For example, KEVLAR® para-aramid fibers and NOMEX® meta-aramid fibers produced commercially by Dupont are preferred aramid materials. Also useful are aramid fibers produced commercially by Teijin under the trademark TWARON®.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and are widely commercially available.

The other suitable fiber types for use in the present invention include glass fibers, fibers formed from carbon, fibers formed from basalt or other minerals, rigid rod fibers such as M5® fibers, and combinations of all the above materials, all of which are commercially available. For example, the fibrous layers may be formed from a 50:50 hybrid combination of SPECTRA® fibers and KEVLAR® fibers, or any other ratio of two or more fiber types. M5® fibers are manufactured by Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5 fibers, polyethylene SPECTRA® fibers, and aramid KEVLAR® fibers. The fibers may be of any suitable denier, such as, for example, 50 to about 3000 denier, more preferably from about 200 to 3000 denier, still more preferably from about 650 to about 1500 denier, and most preferably from about 800 to about 1300 denier.

The most preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more.

These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid and meta-aramid fibers, are also conventionally known in the art, and the fibers are commercially available.

As discussed above, the matrix may be applied to a fiber in a variety of ways. For example, the polymeric matrix composition may be applied in solution form by spraying or roll coating a solution of the matrix composition onto fiber surfaces, wherein a portion of the solution comprises the desired polymer or polymers and a portion of the solution comprises a solvent capable of dissolving the polymer or polymers, followed by drying. Another method is to apply a neat polymer of the coating material to fibers either as a liquid, a sticky solid or particles in suspension or as a fluidized bed. Alternatively, the coating may be applied as a solution or emulsion in a suitable solvent which does not adversely affect the properties of the fiber at the temperature of application. For example, the fiber can be transported through a solution of the matrix composition to substantially coat the fiber and then dried to form a coated fiber. The resulting coated fiber can then be arranged into the desired network configuration. In another coating technique, a layer of fibers may first be arranged, followed by dipping the layer into a bath of a solution containing the matrix composition dissolved in a suitable solvent, such that each individual fiber is substantially coated with the matrix composition, and then dried through evaporation of the solvent. The dipping procedure may be repeated several times as required to place a desired amount of matrix composition coating on the fibers, preferably encapsulating each of the individual fibers or covering 100% of the fiber surface area with the matrix composition.

While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using the gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fiber may be extruded into a fluidized bed of an appropriate polymeric powder. Furthermore, if a stretching operation or other manipulative process, e.g. solvent exchanging, drying or the like is conducted, the coating may be applied to a precursor material of the final fiber. In the most preferred embodiment of the invention, the fibers of the invention are first coated with the matrix composition, followed by arranging a plurality of fibers into either a woven or non-woven fiber layer. Such techniques are well known in the art.

Following the application of the matrix material, the individual fibers in a non-woven layer may or may not be bonded to each other prior to consolidation. As described above, each non-woven layer comprises fibers unidirectionally aligned in parallel to one another along a common fiber direction. As is conventionally known in the art, excellent ballistic resistance is achieved when individual fiber layer are cross-plied such that the fiber alignment direction of one layer is rotated at an angle with respect to the fiber alignment direction of another layer. Accordingly, successive layers of such unidirectionally aligned fibers are preferably rotated with respect to a previous layer. An example is a two layer structure wherein adjacent layers are aligned in a 0°/90° orientation. However, adjacent layers can be aligned at virtually any angle between about 0° and about 90°, such as +60°/−30° or ±45° or any other angles, with respect to the longitudinal fiber direction of another layer. For example, a five layer non-woven structure may have plies at a 0°/45°/90°/45°/0° orientation or at other angles. In the preferred embodiment of the invention, only two individual non-woven layers, cross plied at 0° and 90°, are consolidated into a single layer network, wherein one or more of said single layer networks make up a single non-woven panel. However, as described previously, the single-layer consolidated networks of the invention may generally include any number of cross-plied layers, such as about 20 to about 40 or more layers as may be desired for various applications. Such rotated unidirectional alignments are described, for example, in U.S. Pat. Nos. 4,457,985; 4,748,064; 4,916,000; 4,403,012; 4,623,573; and 4,737,402. The non-woven fiber networks can be constructed using well known methods, such as by the methods described in U.S. Pat. No. 6,642,159.

Suitable bonding conditions for consolidating the fiber layers into a single layer, consolidated network, or fabric composite, include conventionally known lamination techniques. A typical lamination process includes pressing the cross-plied fiber layers together at about 110° C., under about 200 psi (1379 kPa) pressure for about 30 minutes. The consolidation of the fibers layers of the invention is preferably conducted at a temperature from about 200° F. (~93° C.) to about 350° F. (~177° C.), more preferably at a temperature from about 200° F. to about 300° F. (~149° C.) and most preferably at a temperature from about 200° F. to about 280° F. (~121° C.), and at a pressure from about 25 psi (~172 kPa) to about 1500 psi (3447 kPa) or higher. Lower pressure consolidation may be conducted in an autoclave, as is conventionally known in the art. Higher pressure consolidation is preferably conducted using a match die mold. Higher pressure molding is preferred because the higher pressures result in higher ballistic resistance with minimum back face deformation.

When heating, it is possible that the matrix can be caused to stick or flow without completely melting. However, generally, if the matrix material is caused to melt, relatively little pressure is required to form the composite, while if the matrix material is only heated to a sticking point, more pressure is typically required. The consolidation step may generally take from about 10 seconds to about 24 hours. However, the temperatures, pressures and times are generally dependent on the type of polymer, polymer content, process and type of fiber.

Figure 3:
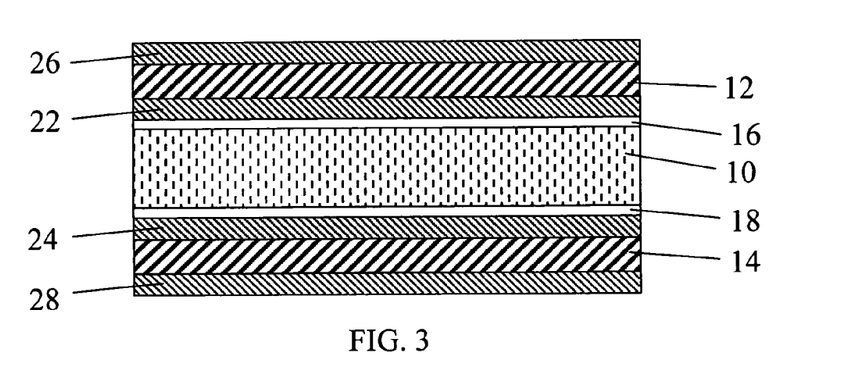
FIG. 3 is a perspective view schematic representation of a composite including a fire resistant material attached to opposing surfaces of each non-woven fibrous panel.

As illustrated in FIG. 1 and FIG. 3, the first and second panels are preferably adhered to each opposing surface of the central panel using an adhesive layer 16, 18. Any suitable adhesive material may be used, as would be conventionally known in the art. Suitable adhesives non-exclusively include elastomeric materials such as polyethylene, cross-linked polyethylene, chlorosulfonated polyethylene, ethylene copolymers, polypropylene, propylene copolymers, polybutadiene, polyisoprene, natural rubber, ethylene-propylene copolymers, ethylene-propylene-diene terpolymers, polysulfide polymers, polyurethane elastomers, polychloroprene, plasticized polyvinylchloride using one or more plasticizers that are well known in the art (such as dioctyl phthalate), butadiene acrylonitrile elastomers, poly (isobutylene-co-isoprene), polyacrylates, polyesters, unsaturated polyesters, polyethers, fluoroelastomers, silicone elastomers, copolymers of ethylene, thermoplastic elastomers, phenolics, polybutyrals, epoxy polymers, styrenic block copolymers, such as styrene-isoprene-styrene or styrene-butadiene-styrene types, and other suitable adhesive compositions conventionally known in the art. Particularly preferred adhesive compositions for bonding honeycomb materials to composites include metahacylate adhesives, cyanoacrylate adhesives, UV cure adhesives, urethane adhesives, epoxy adhesives and blends of the above materials. Of these, an adhesive comprising a polyurethane thermoplastic adhesive, particularly a blend of one or more polyurethane thermoplastics with one or more other thermoplastic polymers, is preferred. Most preferably, the adhesive comprises a polyether aliphatic polyurethane. Such adhesives may be applied, for example, in the form of a hot melt, film, paste or spray, or as a two-component liquid adhesive.

As seen in FIGS. 1 and 3, each of the first panel 12 and the second panel 14 have two opposing surfaces to which additional layers may be adjoined prior to attaching said first panel 12 and said second panel 14 to the central panel 10. For example, one or more additional fibrous or non-fibrous layers may be attached to the surfaces of the first and second panels to further improve the properties of the overall composite. Particularly, in order to enhance the fire resistance properties of the first and second panels, it is preferred to attach at least one layer of a fire resistant material to one or both of the surfaces of each panel. This embodiment is illustrated in FIG. 3, wherein fire resistant layers 22 and 26 are attached to the surfaces of first panel 12, and fire resistant layers 24 and 28 are attached to the surfaces of second panel 14. While the embodiment exemplified in the figure includes such a material on each surface of both panels 12 and 14, any one or more of the four panel surfaces may have such a material attached thereto.

The optional fire resistant material may comprise any material commonly known in the art to provide the desired fire resistance properties. Suitable materials include aramid papers, such as made from the KEVLAR®, NOMEX® or KOREX® fibers described above. Also suitable are conventionally known fiberglass materials, including electric grade fiberglass (e-glass) and structural grade fiberglass (s-glass). These fiberglass materials are preferably impregnated with a thermosetting or thermoplastic polymeric resin, such as a thermosetting epoxy or phenolic resin. In the preferred embodiment of the invention, about 1 to 2 layers of fiberglass are attached to the interior surfaces of the first panel 12 and the second panel 14 (represented by numerals 22 and 24 in FIG. 3). More preferably, about 1 to 2 layers of fiberglass are attached to both surfaces of the first panel 12 and the second panel 14. Suitable materials for fire resistant layers 22, 24, 26 and 28 also include a fibrous material impregnated with a fire resistant composition. Such materials are well known in the art. Alternately, to improve the fire resistance of panels 12 and 14, a fire resistant additive may be blended with the polymeric matrix composition which is coated on the fibers. Preferred fire resistant additives include intumescent, charring materials which are known in the art.

In each embodiment, the central panel 10 is bonded together with the first panel 12, second panel 14, adhesive layers 16 and 18, and optional fire resistance layers 22, 24, 26 and 28 in a single molding step. Conventionally known molding techniques, such as the above described techniques for consolidation, may be used to form a composite. Alternate methods of bonding the above materials, such as stitching, bolting, or adhering with adhesive materials may be used but are not preferred as they do not achieve optimum results. Prior to uniting central panel 10 with first panel 12 and second panel 14, it is preferred that each of panels 12 and 14 are independently molded or consolidated to unite their component parts, preferably forming a rigid panel. In order to achieve rigidity, it is necessary to have a thermosetting matrix composition, and molding generally must be conducted at high pressure, e.g. about 1500 psi or greater, causing the matrix composition to crosslink and cure. Each of the molded panels 12 and 14 may further be cut at ±45 degree, +60/−30 or any other angle and then glued on the Honeycomb. Such combinations can provide torsion stiffness. The prefabricated panels 12,14 can be attached to the central panel 10 using a vacuum bag, or simply using a room temperature matrix resin without using either vacuum bag, autoclave or match-die mold.

The thickness of the individual fabric layers and panels will correspond to the thickness of the individual fibers. Accordingly, a preferred single-layer, consolidated network and a preferred layer of fire resistant material will have a preferred thickness of from about 25 µm to about 500 µm, more preferably from about 75 µm to about 385 µm and most preferably from about 125 µm to about 255 µm. While such thicknesses are preferred, it is to be understood that other film thicknesses may be produced to satisfy a particular need and yet fall within the scope of the present invention.

The composites of the invention have preferred areal weights of from about 0.1 lb/ft$^2$ (psf)(4.8 Pa) to about 4 psf (191.5 Pa), more preferably of from about 1.00 psf (47.9 Pa) to about 3.00 psf (143.6 Pa), and most preferably from about 1.25 psf (59.8 Pa) to about 2.50 psf (119.7 Pa). Further, the composites of the invention are preferably formed from fibers having a denier of from about 200 to about 2600 denier, more preferably of from about 375 to about 2400 denier, and most preferably from about 500 to about 1500 denier.

The multi-panel structures of the invention may be used in various applications to form a variety of different hard or soft armor ballistic resistant articles using well known techniques. The multi-panel structures are particularly useful for the formation of rigid, hard armor articles, that generally have sufficient mechanical strength to maintain structural rigidity when subjected to a significant amount of stress. Examples of such articles non-exclusively include automobile vehicle doors and structural panels and cockpit doors and bulkhead of aircraft, in addition to structural materials for other structures such as helicopters, railroad vehicles, commercial and naval marine vessels, satellites, missiles, space shuttles, satellite launch vehicles, various land and water transportation vehicles, and other non-transportation related structures, such as architectural wall panels, explosion containing devices, protective shields, and other energy absorption protective structures. Such structures can formed by techniques which are well known in the art.

The multi-panel structures of the invention may be used to defeat a number of ballistic threats, such as 9 mm full metal jacket (FMJ) bullets, rifle bullets and a variety of fragments generated due to explosion of hand-grenades, artillery shells, Improvised Explosive Devices (IED). The ballistic resistance properties of the composites of the invention are determined using standard testing procedures that are well known in the art. Particularly, the protective power or penetration resistance of a structure is normally expressed by citing the impacting velocity at which 50% of the projectiles penetrate the composite while 50% are stopped by the composite, also known as the $V_{50}$ value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite panel divided by the surface area, the higher the $V_{50}$, the better the resistance of the composite. The ballistic resistant properties of the articles of the invention will vary depending on many factors, particularly the type of fibers used to manufacture the fabrics. However, the combination of a central panel 10 comprising a honeycomb-shaped structure sandwiched between non-woven fibrous panels 12 and 14 provides highly desirable structures having a combination of superior structural properties, impact resistance properties and ballistic resistant properties.

The ballistic composites of the invention preferably have a ballistic resistance which meets or exceeds the requirements of the National Institute for Justice level III-A ballistic penetration standard. Specifically, rigid ballistic armor formed herein preferably has a $V_{50}$ of at least about 1550 feet/second (fps) (472 m/sec) when impacted with a 9 mm full metal jacket (FMJ) bullet, a $V_{50}$ of at least about 1550 fps when impacted with a 44 magnum bullet and a $V_{50}$ of at least about 1550 fps when impacted with a 17 grain fragment simulated projectile (fsp). Accordingly, it has been found that structures of the invention achieve the same NIJ Level III A ballistic protection with a weight of at least about 15% to about 30% lighter for defeating the same bullets because of the selection of the non-woven fibers over woven fibers, matrix polymer selection and content, and from prefabricating the first and second panels 12,14 at high pressure.

The following non-limiting examples serve to illustrate the invention.

EXAMPLE 1

A 10"×10" (25.4 cm×25.4 cm) three-panel composite was molded according to the invention. The central panel comprised HexWeb® CFC-20 honeycomb manufactured by Hexcel Corporation, having a thickness of ½" (1.27 cm) and a ⅛" (3.175 mm) hexagonal cell size. The honeycomb was adhesively attached on each side to a molded panel of SPECTRA® Shield VE, a unidirectional, non-woven fibrous material from Honeywell International, Inc. incorporating a thermoset, vinyl ester polymeric matrix. One 10"×10" panel of SPECTRA® Shield VE included 11 plies of 0°/90° cross-plied SPECTRA® fibers. The other 10"×10" panel of SPECTRA® Shield VE included 26 plies of 0°/90° cross-plied SPECTRA® fibers. Each individual SPECTRA® Shield VE panel was molded under high pressure using a match-die mold by stacking the component plies in the mold kept at 240° F. (115.6° C.) and applying 1500 psi (10.34 kPa) molding pressure for 10 minutes, followed by cooling down to 150° F. (65.56° C.) under 1500 psi of molding pressure. After the SPECTRA® Shield VE panels were individually molded, they were adhered to a 10"×10" HexWeb® CFC-20 honeycomb central panel with a polyether aliphatic polyurethane adhesive, curing the adhesive in an autoclave at 240° F. under vacuum (14.8 psi) (102 kPa) and pressure (150 psi) (10.34 kPa) for 90 minutes. The ballistic performance of the three-panel structure was tested against a 17 grain, 0.22 caliber MIL-P-46539A projectile using Military Test Standard MIL-STD-662E. The test was conducted by firing the projectile against each side of the non-symmetrical molded composite. In the first row of the table, the test was conducted by firing the projectile at the 11 layer molded panel. In the second row, the test was conducted by firing the projectile at the 26 layer molded panel. The test results are summarized in Table 1 below:

TABLE 1

| Construction | Areal weight (psf) (Pa) | Thickness (inch) (mm) | $V_{50}$ (fps) (mps) | SEAT (J-m/$^2$kg) |
|---|---|---|---|---|
| 11 layer molded panel + honeycomb + 26 layer molded panel | 1.50 (71.8 Pa) | 0.69 (17.53 mm) | 1993 (607.5 m/sec) | 27.5 |
| 26 layer molded panel + honeycomb + 11 layer molded panel | 1.50 (71.8 Pa) | 0.69 (17.53 mm) | 1795 (547.1 m/sec) | 22.3 |

EXAMPLE 2 (COMPARATIVE)

The results from Example 1 were compared to a molded SPECTRA® Shield panel without honeycomb. The ballistic performance of a 12"×12" (30.48 cm×30.48 cm) molded panel including only 37 layers of molded SPECTRA® Shield VE described above was tested against a 17 grain, 0.22 caliber MIL-P-46539A projectile using Military Test Standard MIL-STD-662E. The test results are summarized in Table 2 below:

TABLE 2

| Construction | Areal Weight (psf) (Pa) | Thickness (inch) (mm) | $V_{50}$ (fps) (mps) | SEAT (J-m$^2$/kg) |
|---|---|---|---|---|
| 37 layer molded SPECTRA Shield VE panel | 1.00 (47.9 Pa) | 0.22 (5.6 mm) | 1725 (525.8 m/sec) | 30.9 |

The above examples illustrate an improvement in the ballistic resistance properties of the three-panel honeycomb composites structure of the invention compared to panels without honeycomb.

EXAMPLE 3

A similar panel to the three-panel composite of Example 1 was tested against a 44 magnum bullet using test method NIJ 0108.01. The result was successful as the bullet was stopped in the panel. The results are summarized in Table 3 below:

TABLE 3

| Construction | Areal Weight (psf) (Pa) | Thickness (inch) (mm) | $V_0$ (fps) (mps) |
|---|---|---|---|
| 11 layer molded panel + honeycomb + 26 layer molded panel | 1.50 (71.8 Pa) | 0.65 (16.51 mm) | 1430 ± 30 (435.8 m/sec ± 9.14) |

This example illustrates the excellent ballistic resistance of a composite of the invention against a 44 magnum bullet when the bullet is fired at the 11 layer molded panel.

EXAMPLE 4

The flexural strength and stiffness of the three-panel composite of Example 1 were tested using the ASTM D790 test method, and a three-point bend test with a 10-inch span. The results are summarized in Table 4 below:

TABLE 4

| Construction | Flexural Strength (ksi) (MPa) | Flexural Modulus (ksi) | Deflection (inch) (mm) | Energy to yield point (lbf-in) |
|---|---|---|---|---|
| 11 layer molded panel + honeycomb + 26 layer molded panel | 1.49 (10.3 MPa) | 324 (2234 MPa) | 0.11 (2.79 mm) | 2.9 |
| 26 layer molded panel + honeycomb + 11 layer molded panel | 2.24 (15.4 MPa) | 314 (2165 MPa) | 0.20 (5.08 mm) | 8.9 |

In the first row of the table, the ASTM D790 test was conducted with a load placed on the 11 layer molded panel. In the second row, the test was conducted with a load placed on the 26 layer molded panel. This example illustrates the difference in structural properties for each side of an unbalanced composite of the invention according to the ASTM D790 test method when the composite is tested from each side.

EXAMPLE 5 (COMPARATIVE)

The flexural strength and stiffness of the three-panel composite of Example 2 were tested using the ASTM D790 test method, and a three-point bend test with a 4-inch span. The results are summarized in Table 5 below:

TABLE 5

| Construction | Flexural Strength (ksi) (MPa) | Flexural Modulus (ksi) (MPa) | Deflection (inch) (mm) | Energy to yield point (lbf-in) |
|---|---|---|---|---|
| 37 layer molded panel | 1.89 (13.0 MPa) | 212 (1462 MPa) | 0.29 (7.366 mm) | 1.47 |

Examples 4 and 5 illustrate the greater structural properties of a composite including a honeycomb compared to a composite including only fibrous layers.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A rigid ballistic resistant composite comprising:
   a) a first rigid panel comprising a plurality of non-woven fibrous layers, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more;
   b) a central panel in juxtaposition with said first rigid panel; the central panel comprising a plurality of closely packed geometric cells; and
   c) a second rigid panel comprising a plurality of non-woven fibrous layers in juxtaposition with said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more.

2. The ballistic resistant composite of claim 1 wherein said first panel and said second panel are adhesively attached to said central panel on opposite sides of the central panel.

3. The ballistic resistant composite of claim 1 wherein polymeric composition comprises a thermoset composition.

4. The ballistic resistant composite of claim 1 wherein the polymeric composition comprises a vinyl caster polymer.

5. The ballistic resistant composite claim 1 wherein the polymeric composition comprises a combination of a thermoset composition and a thermoplastic composition.

6. The ballistic resistant composite of claim 1 wherein said first panel and said second panel each comprise a plurality of plies of said consolidated non-woven fibrous layers, and wherein said composite is non-symmetrical.

7. The ballistic resistant composite of claim 1 wherein said first panel and said second panel each independently comprise polyolefin fibers, aramid fibers, polybenzazole fibers, polyvinyl alcohol fibers. polyamide fibers, polyethylene terephthalate fibers, polyethylene naphihalate fibers, polyacrylonitrile fibers, liquid crystal eopolyestcr fibers, glass fibers, carbon fibers, rigid rod fibers or a combination thereof 8. The ballistic resistant composite of claim 1 wherein said first panel and said second panel each comprise polyethylene fibers.

9. The ballistic resistant composite of claim 1 wherein said polymeric composition comprises from about 7% to about 35% by weight of each of said first panel and said second panel.

10. The ballistic resistant composite of claim 1 wherein said first panel and said second panel comprise a plurality of unidirectional, non-woven fiber layers that are cross-plied at an angle relative to a longitudinal fiber direction of an adjacent fiber layer.

11. The ballistic composite of claim 1 wherein said central panel comprises a honeycomb-shaped structure.

12. The ballistic composite of claim 1 wherein said central panel comprises a meta-aramid material.

13. The ballistic composite of claim 1 having a ballistic resistance which exceeds the requirements of the National Institute for Justice level III-A ballistic penetration standard.

14. An article comprising the ballistic resistant composite of claim 1.

15. The article of claim 14 which comprises a structural member of a vehicle.

16. A rigid ballistic resistant composite comprising:
a) a first rigid panel comprising a plurality of non-woven fibrous layers, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said first rigid panel having two opposing surfaces;
b) a central panel in juxtaposition with said first rigid panel; the central panel comprising a plurality of closely packed geometric cells;
c) a second rigid panel comprising a plurality of non-woven fibrous layers in juxtaposition with said central panel, the non-woven fibrous layers comprising a plurality of fibers coated wit a polymeric composition, and said non-woven fibrous layers being consolidated; said fibers having a tenacity of about 7 g/denier or more and a tensile modulus of about 150 g/denier or more; and said second rigid panel having two opposing surfaces;
d) at least one layer of a fire resistant material attached to at least one surface of said first rigid panel; and
e) optionally, at least one layer of a fire resistant material attached to at least one surface of said second rigid panel.

17. The ballistic resistant composite of claim 16 further comprising at least one layer of a fire resistant material attached to at least one surface of said second panel.

18. The ballistic resistant composite of claim 16 further comprising at least one layer of a fire resistant material attached to both opposing surfaces of said first panel and at least one layer of a fire resistant material attached to both opposing surfaces of said second panel.

19. The ballistic resistant composite of claim 16 wherein said fire resistant material comprises fiberglass.

20. The ballistic resistant composite of claim 16 wherein said fire resistant material comprises aramid paper.

21. The ballistic resistant composite of claim 16 wherein said fire resistant material campuses a fibrous material impregnated with a tire resistant composition.

22. The ballistic resistant composite of claim 16 wherein said polymeric composition comprises a thermoset composition.

23. The ballistic resistant composite of claim 16 wherein the polymeric composition comprises a vinyl ester polymer.

24. The ballistic resistant composite of claim 16 wherein the polymeric composition comprises a combination of a thermoset composition and a thermoplastic composition.

25. The ballistic resistant composite of claim 16 wherein said first panel and said second panel each comprise a plurality of plies of said consolidated non-woven fibrous layers, and wherein said composite is non-symmetrical.

26. The ballistic resistant composite of claim 16 wherein said first panel and said second panel each independently comprise polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, glass fibers, carbon fibers, rigid rod fibers or a combination thereof 27. The ballistic resistant composite of claim 16 wherein said first panel and said second panel comprise polyethylene fibers.

28. The ballistic resistant composite of claim 16 wherein said polymeric composition comprises from about 7% to about 35% by weight of each of said first panel and said second panel.

29. The ballistic resistant composite of claim 16 wherein said first panel and said second panel comprise a plurality of unidirectional, non-woven fiber layers that are cross-plied at an angle relative to a longitudinal fiber direction of an adjacent fiber layer.

30. The ballistic resistant composite of claim 16 wherein said central panel comprises a honeycomb-shaped structure.

31. The ballistic resistant composite of claim 16 wherein said central panel comprises a meta-aramid material.

32. The ballistic resistant composite of claim 16 having a ballistic resistance which exceeds the requirements of the National Institute for Justice level III-A ballistic penetration standard.

33. An article comprising the ballistic resistant composite of claim 16.

34. The article of claim 33 which comprises a structural member of a vehicle.

35. A method for forming a rigid ballistic resistant composite comprising:
   a) providing a central panel comprising a plurality of closely packed geometric cells, said central panel having first and second surfaces;
   b) attaching a first rigid panel comprising a plurality of non-woven fibrous layers to the first surface of said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said first rigid panel having two opposing surfaces; and
   c) attaching a second rigid panel comprising a plurality of non-woven fibrous layers to the second surface of said central panel, the non-woven fibrous layers comprising a plurality of fibers coated with a polymeric composition, and said non-woven fibrous layers being consolidated; said fibers having a tenacity of about 7 g/denier or more and a tensile modulus of about 150 g/denier or more; and said first second rigid panel having two opposing surfaces.

36. The method of claim 35 said first panel and said second panel are attached to said central panel via an intermediate adhesive layer.

37. The method of claim 35 further comprising attaching at least one layer of a fire resistant material to at least one surface of said first panel.

38. The method of claim 35 further comprising attaching at least one layer of a fire resistant material to at least one surface of said second panel.

39. The method of claim 35 further comprising attaching at least one layer of a fire resistant material to at least one surface of said first panel and attaching at least one layer of a fire resistant material to at least one surface of said second panel.

40. The method of claim 35 further comprising attaching at least one layer of a fire resistant material to both surfaces of said first panel prior to attaching said first panel to said central panel, and attaching at least one layer of a lire resistant material to both surfaces of said second panel prior to attaching said second panel to said central panel 41. The method of claim 35 comprising subsequently molding said composite into a structural member of a vehicle.

42. The method of claim 35 further comprising attaching at least one layer of a fire resistant material to both surfaces of said first panel prior to attaching said first panel to said central panel, and attaching at least one layer of a lire resistant material to both surfaces of said second panel prior to attaching said second panel to said central panel, and wherein the panels are attached by molding under high pressure in a match die mold.

43. The method of claim 35 wherein said polymeric composition comprises a thermoset composition.

* * * * *